United States Patent
Perner et al.

(10) Patent No.: US 7,327,868 B2
(45) Date of Patent: Feb. 5, 2008

(54) MAGNETIC STRIPLINE SCANNER

(75) Inventors: Fredrick A. Perner, Santa Barbara, CA (US); Manish Sharma, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 673 days.

(21) Appl. No.: 10/861,008

(22) Filed: Jun. 4, 2004

(65) Prior Publication Data

US 2005/0269409 A1    Dec. 8, 2005

(51) Int. Cl.
*G06K 9/00*    (2006.01)

(52) U.S. Cl. .................. 382/140; 382/313; 235/472.01

(58) Field of Classification Search ................ 382/100, 382/101, 102–108, 112–116, 143, 168, 172, 382/181, 274, 185–193, 312–321, 135–140, 382/182, 232, 305; 705/26; 324/238, 244; 235/472.01

See application file for complete search history.

(56) References Cited

U.S. PATENT DOCUMENTS

| | | | |
|---|---|---|---|
| 5,574,804 A * | 11/1996 | Olschafskie et al. ........ 382/313 |
| 6,075,240 A | 6/2000 | Watanabe et al. |
| 6,081,630 A | 6/2000 | Kaneko |
| 6,150,809 A * | 11/2000 | Tiernan et al. ............... 324/238 |
| 6,529,645 B2 | 3/2003 | Fahraeus et al. |
| 6,704,124 B2 | 3/2004 | Hu et al. |
| 7,077,327 B1 * | 7/2006 | Knowles et al. ........ 235/472.01 |
| 7,145,330 B2 * | 12/2006 | Xiao ........................... 324/244 |
| 7,155,405 B2 * | 12/2006 | Petrovich ..................... 705/26 |
| 7,197,174 B1 * | 3/2007 | Koizumi ..................... 382/139 |

* cited by examiner

*Primary Examiner*—Seyed Azarian (57) ABSTRACT

A magnetic stripline scanner for reading lines of magnetic data on a media including a portable housing having a scanning side. A linear array of magnetic field sensors, such as spin valve magnetic memory cells, is at least partially disposed within the housing, proximate to the scanning side. The magnetic field sensors are capable of detecting external magnetic fields of a threshold intensity. A controller mounted within the housing and coupled to the magnetic field sensors determines the orientation of the sensed magnetic field and thereby infers the binary value represented by the magnetic field. A magnetic stripline scanning system incorporating the scanner with non traditional media such as paper providing lines of magnetic material is also provided. A method of use is also provided.

29 Claims, 5 Drawing Sheets

MAGNETIC STRIPLINE SCANNER

FIELD OF THE INVENTION

The present invention relates generally to scanning systems, and in particular to hand held magnetic data scanners for reading lines of magnetic data on media such as cloth or paper.

BACKGROUND

Today's computer systems are becoming increasingly sophisticated, permitting users to perform an ever increasing variety of computing tasks at faster and faster rates. Data storage and retrieval are two issues involved in nearly every computer operation.

Hard copy and soft copy are terms generally applied to distinguish between printed materials and electronic copies. To be non-volatile, the soft copy/electronic copy is traditionally stored in an appropriate data storage media.

Traditional forms of electronic data storage rely upon recording media set down with rigid devices, such as the magnetic media utilized in hard drives, floppy drives and magnetic tape. In a great many instances, a printed representation of the stored data is created, for example, in a textual document, graphic, chart, table or photograph.

Unlike a computer, a printed document does not require a continuous source of power to be enjoyed. Documents printed on paper are also portable and easily passed from one person to another.

With respect to a page of printed text, the amount of information available is generally limited by both the resolution of the character text printing device and the visual acuity of the party observing the printed document. In general, printed documents are rendered in easy to read type, such as Times New Roman or Arial, and in font size of between 10 and 12 to balance reading ease on the eye with density of material provided.

Optical text scanners are known and provide a means for converting paper-based objects, including text and graphics, into an electronic format that can be used by a computer system. Such optical scanning is not without difficulty. Errors are prone to exist in the character to electronic data conversion, resulting in corruptions within the converted data.

In addition, in most cases, the smaller the font or image being scanned and converted, the higher the likelihood of error in the digital conversion process. As such, for most optical character recognition systems, the amount of equivalent digitized data is substantially equivalent to the visual data presented. While perhaps appropriate for small portions of text and images, optical scanning is rather inefficient for the dissemination of applications or other data. For example, a word processor file providing hundreds if not thousands of pages of printed text may be stored on a single 3.5" floppy disc.

The use of ink containing magnetic particles capable of supporting high density data will soon provide general users with the ability to print paper documents that provide both visual text and image data, and also provide digital information. Such digital information may, for example, be a soft copy version of the hard copy document, an application, or database information.

The ability to generate a storage medium when and where needed, and more cheaply than can be accomplished when using third party products such as floppy discs or optical discs, is likely to spur rapid growth in the creation of paper-based magnetic media storage devices. Although the lateral motion of a magnetic ink equipped inkjet printer provides one vehicle for permitting a user to read or write digital information to non-standard media, typical inkjet printers are not portable.

As portable computers—such as PDA's, laptops and other computing devices—become increasingly more commonplace, the need to read magnetically encoded data from non-standard media in the field (as in a place away from a desktop scanner or other non-portable device) will increase as well. Present optical scanning devices cannot meet this need as the elemental data to be scanned is physically different as is the scanning process.

For example, preset optical scanning devices are designed to read and recognize traditional human user information such as words into a form and are not capable of scanning or recognizing magnetically encoded digital information. In addition, traditional optical scanner are capable of scanning and processing only that which is visible. Where the data has been printed under an image or printed in invisible ink, the optical scanner is likely to be entirely ineffective.

Although magnetic read/write devices are commonly employed in data storage systems, there is currently a market void of portable magnetic scanners for use in scanning magnetic data on non-standard media.

Hence, there is a need for a portable magnetic stripline scanner device that overcomes one or more of the drawbacks identified above.

SUMMARY

The present disclosure advances the art and overcomes problems articulated above by providing a magnetic stripline scanner device and magnetic stripline scanner system.

In particular and by way of example only, according to an embodiment of the present invention, this invention provides a magnetic stripline scanner for reading lines of magnetic data on a media including: a portable housing having a scanning side; a magnetic field sensing means disposed within the housing proximate to the scanning side for sensing data encoded as magnetic fields within the media when the housing is oriented with respect to the media such that the scanning side is adjacent the media and magnetic lines; and a magnetic field orientation detector means, disposed within the housing and coupled to the magnetic field sensing means, for detecting the relative orientation a magnetic field sensed from each of a plurality of magnetic data sectors upon the media in the magnetic data lines.

DETAILED DESCRIPTION

Before proceeding with the detailed description, it is to be appreciated that the present teaching is by way of example, not limitation. The concepts herein are not limited to use or application with a specific type of magnetic media storage system. Thus, although the instrumentalities described herein are for the convenience of explanation, shown and described with respect to exemplary embodiments, it will be appreciated that the principals herein may be equally applied in other types of magnetic media storage.

Figure 1:
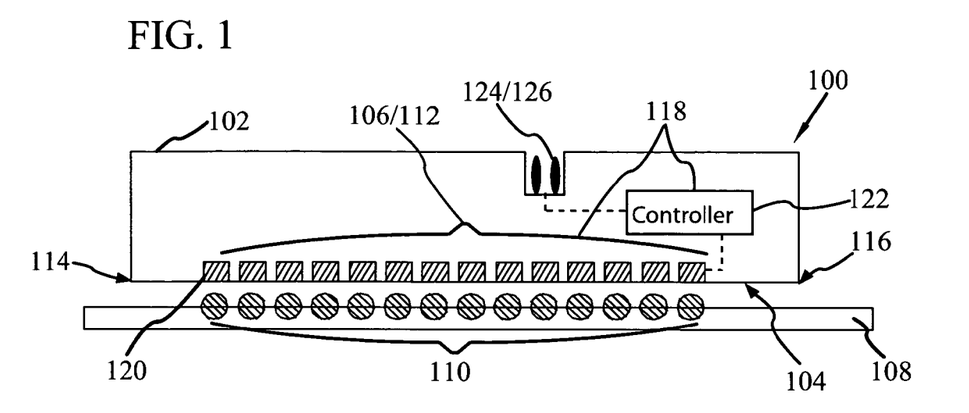
FIG. 1 a side cutaway view of a magnetic stripline scanner according to one embodiment.
Figure 2:
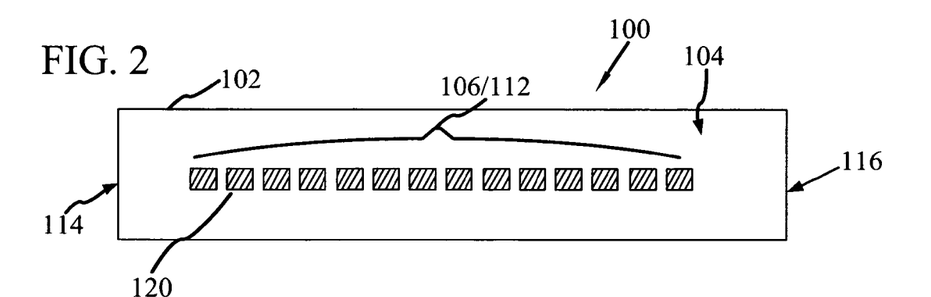
FIG. 2 is a bottom view of the magnetic stripline scanner shown in FIG. 1.
Figure 3:
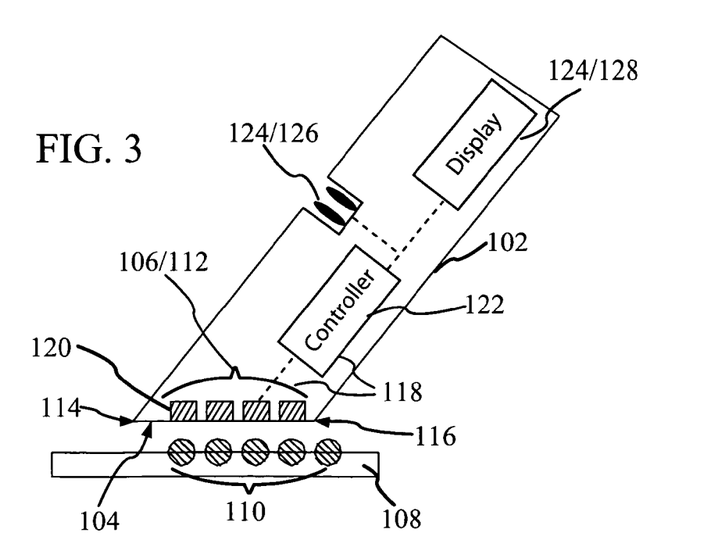
FIG. 3 is a side cutaway view of a magnetic stripline scanner according to another embodiment.

Referring now to the drawings, and more particularly FIG. 1 through 3, there is shown a conceptual rendering of an embodiment of a magnetic stripline scanner 100, having a portable housing 102 presenting a scanning side 104 and a magnetic field sensing means 106 disposed within the housing 102 proximate to the scanning side 104.

The magnetic field sensing means 106 permits the sensing of data encoded as magnetic fields upon a media 108 when the housing 102 is oriented with respect to the media 108 such that the scanning side 104 is adjacent to the media 108 and the lines of magnetic data 110 on the media 108. As FIG. 1 is a cross sectional view, for ease of discussion, the lines of magnetic data 110 are conceptually represented as cross sectional circles.

In at least one embodiment, the magnetic field sensing means 106 is a linear array of magnetic field sensors 120 at least partially disposed within the housing 102 and proximate to the scanning side 104. In addition, in at least one embodiment, the plurality of magnetic field sensors 120 operates simultaneously. The linear array of magnetic field sensors 120 is commonly referred to as a stripline field sensor 112. Moreover, the housing 102 may be further described as having a first end 114, a second end 116, and a scanning side 104 therebetween.

A controller 122 is mounted within the portable housing 102 and is coupled to the linear array of magnetic field sensors 120, otherwise known as the stripline field sensor 112. In at least one embodiment, an output device 124 is coupled to the controller to provided information read from the magnetic data 110.

FIG. 2 provides a bottom view of the magnetic stripline scanner 100 illustrated in FIG. 1. FIG. 3 illustrates an embodiment wherein the stripline of magnetic field sensors 120 is provided in a housing 102 configured for holding as a pen by a user. In addition, FIG. 3 illustrates one output device 124 as a communications port 126 and another output device 126 as a visual display 128. As illustrated the stripline field sensor 112 in FIG. 3 is of a different length than the stripline field sensor 112 shown in FIGS. 1 and 2. In at least one embodiment the communications port 126 is preferably a USB port permitting the transfer of data to a computer system (not shown) and providing power to the magnetic stripline scanner 100 as is commonly understood and permitted with USB port technology. Visual display 128 may provide the user with operational data, such as "system on", "scanning", "error", a translation of a portion of the scanned data, or other information helpful to the user in operating the magnetic stripline scanner 100.

The portable housing 102 is composed of a non-magnetic material, such as, for example, plastic, polycarbonate, silicon or other material providing a structurally sound housing. In addition, in at least one embodiment, the material comprising the scanning side 104 does not substantially affect the magnetic fields emanating from a magnetic encoded media 108 over which the magnetic stripline scanner 100 is passed.

More specifically, as the magnetic stripline scanner 100 is sensing magnetic fields and not reflected light from printed characters, no light focusing lens is required and the susceptibility of the magnetic stripline scanner 100 to dust and or scratches in or on the scanning side 104 is advantageously reduced. Further the magnetic field sensors 120 may be physically protected from direct physical contact with the data encoded media 108 by being mounted the housing 102.

Briefly stated, at least one principle underlying the storage of data in magnetic media is the ability to change and/or reverse the relative orientation of magnetization of a magnetic storage bit (i.e. the logic state of a "0" or a "1"). Disposed within the housing 102 and coupled to the magnetic field sensing means 106 is a magnetic field orientation detector means 118.

A typical magnetic storage bit, like a typical bar magnet, is generally comprised of magnetic particles. A given magnetic particle generally has two magnetic axes—a hard axis transverse to an easy axis. In a magnetic storage bit, as in a bar magnet, the particles align so as to provided their aggregate structure (storage bit or bar magnet) both a hard axis and an easy axis.

The orientation of magnetization tends to prefer alignment along the easy axis. A convention is established to define, for example, a first orientation along the easy axis as a "0" and an opposite orientation along the easy axis as a "1". A magnetic bit is written to a magnetic particle or group of particles comprising a storage bit by providing a magnetic field of sufficient intensity to re-orient the magnetic alignment of the storage bit to a known direction.

A magnetic particle or group of particles within a storage bit may be sensed to reveal the encoded data patch as a determined orientation of magnetization. Such a sensing of the magnetic field may be performed by providing a magnetic field sensor in close proximity to the magnetic particles, the orientation of the field sensor being influenced by the magnetic orientation representing the stored data patch.

Figure 4:
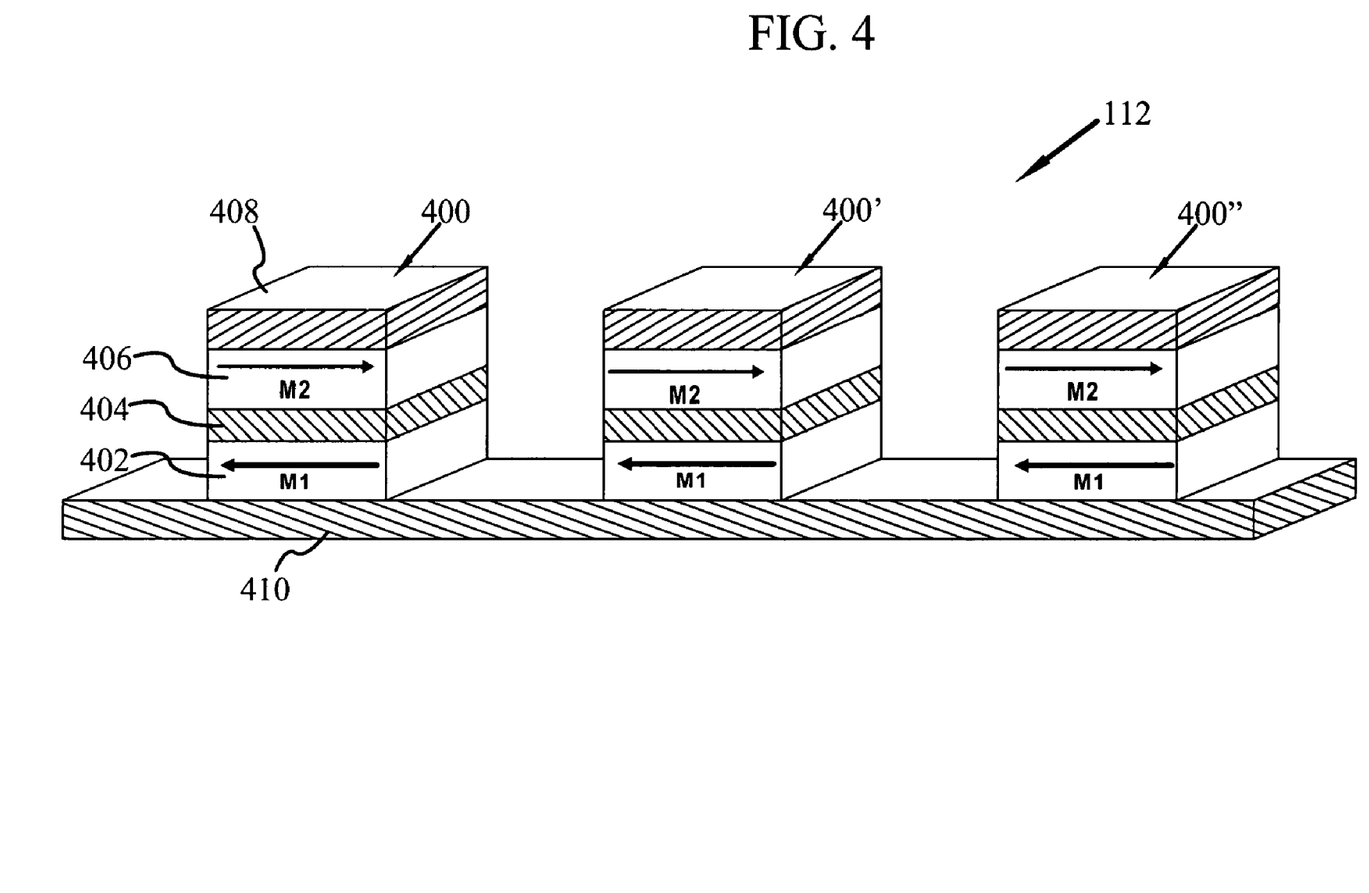
FIG. 4 is a partial perspective view of the magnetic stripline field sensor according to one embodiment and as may be incorporated in FIGS. 1 and/or 3.

In at least one embodiment, each magnetic field sensor 120 is a spin valve magnetic memory (SVM) cell such as SVM cells 400, 400' and 400" illustrated in FIG. 4. As shown, the SVM cell 400 has at least one ferromagnetic sense layer 402, an intermediate layer 404, and at least one reference layer 406. The alterable magnetic orientation of the sense layer 402 is represented as M1. The intermediate layer 404 has opposing sides such that the sense layer 402 in contact with one side is substantially in direct alignment with, and substantially uniformly spaced from, the reference layer 406 in contact with the second side of the intermediate layer 404.

SVM cell 400 is placed between and electrically coupled to a first electrical conductor 408 and second electrical conductor 410. In at least one embodiment, the first electrical conductor 408 is substantially transverse to the second electrical conductor 410. Such cross-point configuration of the electrical conductors permits the isolation of a specific SVM cell 400 within the stripline field sensor 112.

The reference layer 406 provides a reference orientation of magnetization M2. In at least one embodiment the reference layer 406 is a pinned reference layer, having a set orientation of magnetization M2. In an alternative embodiment, the reference layer 406 is a soft-reference layer having a non-pinned orientation of magnetization M2.

The sense layer 402 is typically made from a ferromagnetic (FM) material. The sense layer 402 comprises a material providing an orientation of magnetization M1, alterable in the presence of an external magnetic field of a threshold intensity. As used in the magnetic stripline scanner 100 shown in FIGS. 1, 2 and 3, this threshold intensity is established as the magnetic field intensity of the magnetic material comprising the lines of magnet data 110.

The behavior and properties of SVM cells are generally well understood. Three types of SVM cells in particular are known—a tunneling magneto-resistance memory cell (TMR), a giant magneto-resistance memory cell (GMR) and colossal magneto-resistance memory cell (CMR). GMR and CMR memory cells have similar magnetic behavior, but their magneto-resistance arises from different physical effects, as the electrical conduction mechanisms are different.

More specifically, in a TMR-based memory cell, the phenomenon is referred to as quantum-mechanical tunneling or spin-dependent tunneling. In a TMR memory cell, the intermediate layer 404 is a thin barrier of dielectric material through which electrons quantum mechanically tunnel between the sense layer 402 and the reference layer 406.

In a GMR memory cell, the intermediate layer 404 is a thin spacer layer of non-magnetic but conducting material. Here, the conduction is a spin-dependent scattering of electrons passing between the sense layer 402 and the reference layer 406, though the intermediate layer 404.

In either case, the resistance between the sense layer 402 and the reference layer 406 will increase or decrease depending on the relative orientations of the magnetic fields M1 and M2. It is this difference in resistance that is sensed to determine if the sense layer 402 is sensing a logic state of "0" or a logic state of "1".

Moreover, as the controller 122 is coupled to the SVM cells 400 and thereby aware of the change of resistance within a given SVM cell 400, the controller 122 is able to infer the orientation of a sensed external magnetic field as provided by magnetic data 110. Specifically, the controller 122 distinguishes between a first orientation and a second orientation for a sensed external magnetic field emanating from magnetic data 110. In such an embodiment, the controller 122 and alternating resistive nature of the SVM cells 400 provide the magnetic field orientation detector means 118, identified above with respect to FIGS. 1 through 3. This ability of orientation determination is more fully addressed below.

As indicated above, the logical bit stored in a magnetic media is traditionally represented as an aligned magnetic field. To sense this aligned field, the sense layer 402 of the SVM cell 400 is placed sufficiently proximate to the magnetic data 110 such that the orientation of the sense layer is determined by the aligned field.

In at least one embodiment, the SVM cell 400 is a TMR cell wherein the intermediate layer 404 is a tunnel layer made from an electrically insulating material (a dielectric) that separates and electrically isolates the sense layer 402 from the reference layer 406. Suitable dielectric materials for the dielectric intermediate layer 404 may include, but are not limited to: Silicon Oxide ($SiO_2$), Magnesium Oxide (MgO), Silicon Nitride ($SiN_x$), Aluminum Oxide ($Al_2O_3$), Aluminum Nitride ($AlN_x$) and Tantalum Oxide ($TaO_x$). In at least one embodiment, the intermediate layer 404 is Aluminum Oxide.

In at least one other embodiment, the SVM cell 400 is a GMR or CMR cell wherein the intermediate layer 404 is made from a non-magnetic material such as a 3d, a 4d or a 5d transition metal listed in the periodic table of the elements. Suitable non-magnetic materials for a non-magnetic intermediate layer 404 may include, but are not limited to: Copper (Cu), Gold (Au) and Silver (Ag). In at least one embodiment, the intermediate layer 404 is Copper.

The sense layer 402 and the reference layer 406 may be made from a material that includes, but is not limited to: Nickel Iron (NiFe), Nickel Iron Cobalt (NiFeCo), Cobalt Iron (CoFe), and alloys of such metals. More specifically, in at least one embodiment, the sense layer 402 and the reference layer 406 are Nickel Iron (NiFe). In addition, the first electrical conductor 408 and second electrical conductor 410 may be made from materials that include, but are not limited to, Copper (Cu), Gold (Ag) and Silver (Au).

While the actual thickness of the intermediate layer 404 is dependent upon the materials selected to create the intermediate layer 404 and the type of tunnel memory cell desired, in general, the intermediate layer 404 has a thickness of about 0.5 nm to about 5.0 nm. However, under appropriate circumstances this thickness may be increased or decreased.

In at least one embodiment, the SVM cells 400 comprising the stripline field sensor 112 are fabricated as an integrated circuit, such as for example a CMOS chip. A high density stripline field sensor 112 providing 500 SVM cells 400 per millimeter, equaling 12,500 SVM cells 400 per inch, is easily provided using traditional photolithography fabrication techniques. Such a density advantageously permits the magnetic stripline field sensor 112 to read lines of magnetic data 110 far smaller than the lines of text traditionally read by optical scanners.

This advantageous resolution permits the magnetic stripline scanner 100 to read large quantities of stored data from a single page of magnetically encoded paper. For example, if the magnetic print media is established upon a page utilizing an ink-jet printer providing ink droplets establishing data patches 2 microns in size with 1 micron of space between each 2 micron data patch, the following storage capacity is easily provided.

1 inch=25,400 microns data patch=2 microns buffer space=1 micron (25,400 microns/3)×(25,400 microns/3)=71.6 Megabits per square inch This data density may be increased or decreased depending upon the size of the data patch provided and the buffering space provided between patches. Moreover, allotting for a substantial buffering space and larger data patches still permits a data density of 2.44 megabits per square inch to be read by magnetic stripline scanner 100.

Figure 5:
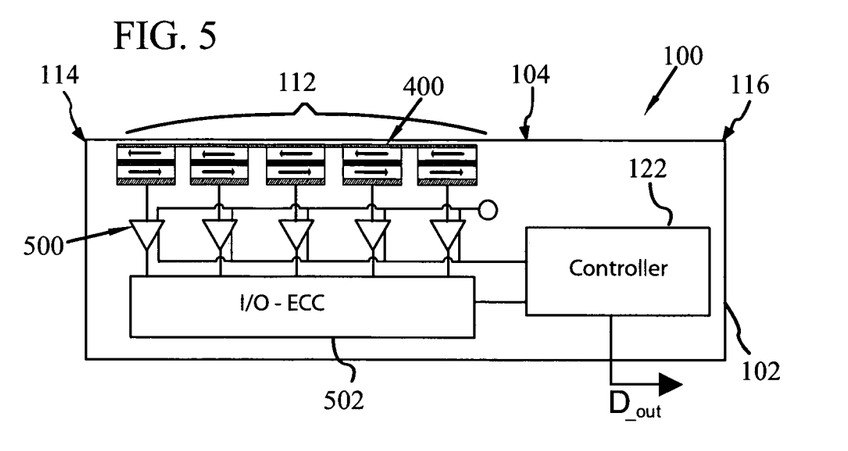
FIG. 5 is a conceptual block diagram of a magnetic stripline scanner according to one embodiment.
Figure 6:
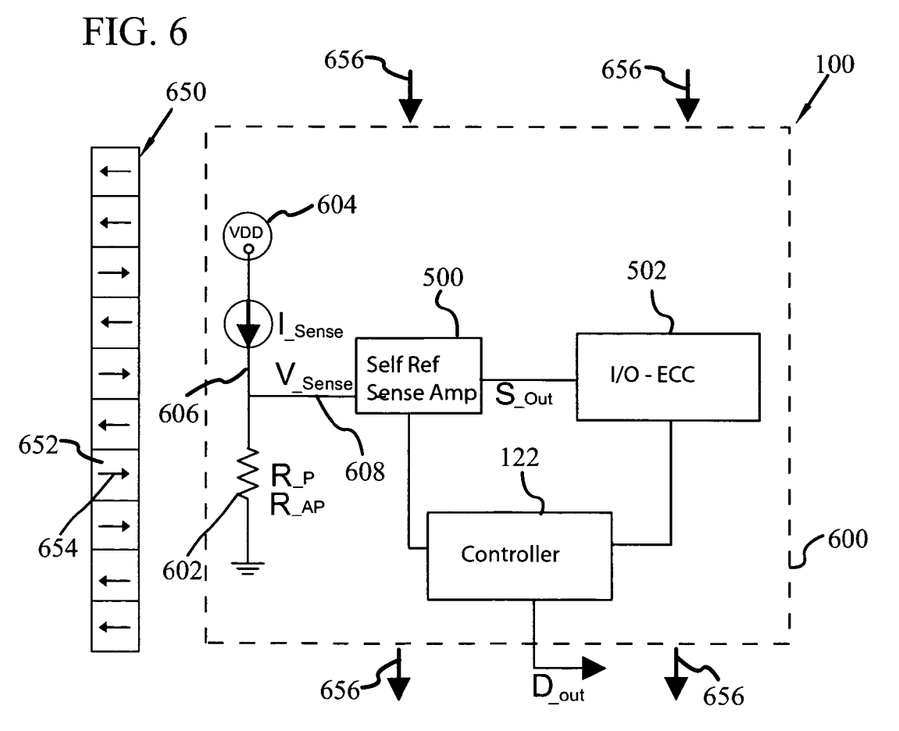
FIG. 6 is an enhanced partial electrical block diagram of the magnetic stripline scanner shown in FIG. 5.

FIGS. 5 and 6 conceptually provide schematic block diagrams of the magnetic stripline scanner 100 of FIGS. 1, 2 and 3. Specifically, in FIG. 5 a plurality of SVM cells 400 are shown proximate to the scanning side 104 of housing 102. Each SVM cell 400 is coupled to a self reference sense amplifier 500.

The electrical components of magnetic stripline scanner 100, according to at least one embodiment, are grouped within dotted line 600, shown in FIG. 6. Specifically, an SVM cell component of the stripline field sensor 112 is represented by variable resistor element 602, herein after referred to as SVM cell 602 with respect to FIGS. 5 and 6. A self reference sense amplifier 500, I/O buffer with error correction circuit (IO-ECC) 502 and controller 122 are also provided. Under appropriate circumstances, these components and their interconnecting electrical connections may be provided on the same semiconductor providing the SVM cells 602 comprising the stripline field sensor 112.

A line of magnetic data present on a media is represented as strip 650. The magnetic orientation of each data patch 652 is represented as a small arrow 654, pointing to the left or right.

As the SVM cell 602 is passed by each data patch 652, (movement indicated by arrows 656) the sense layer of the SVM cell 602 will align to the magnetic field of the data patch 652. The orientation of the sense layer will either be anti-parallel or parallel to the reference layer, resulting in a resistance state within the SVM cell 602 of R_p (resistance parallel) or R_ap (resistance anti-parallel).

A power source 604 provides current, I_sense, to SVM cell 602 by power path 606. Sense path 608 further provides self reference sense amplifier 500 with V_sense, the change in V_sense corresponding to the change in resistance R_p, R_ap, of SVM cell 602.

In at least one embodiment, the power source 604 is a battery pack attached to, or disposed within the housing 102. In at least one alternative, wherein the magnetic stripline scanner 100 is connected to a computer system by communications port 126 (see FIG. 1, 3), power may be provided to the magnetic stripline scanner 100 by the external computer, not shown. Where the power is provided externally, power source 604 functions as a point of internal power distribution.

The raw signal out, S_out, is provided by self reference sense amplifier 500 to the IO-ECC 502. The controller 122 is coupled to both the self reference sense amplifier 500 and the IO-ECC 502 and, based on determined values of resistance, provides output data, D_out, that may be delivered to the at least one output device 124 (communications port 125 or visual display 128) as shown in FIG. 3.

As the single controller 122 may oversee the operation and control of the stripline field sensor 112 comprised of dozens, if not hundreds of SVM cells 602, the data buffer component of the IO-ECC 502 being coupled between the self reference sense amplifier 500 and the controller 122 buffers the flow of detected data for improved management by the controller 122. Error correction code, or ECC as it is commonly known, is additionally provided to improve the quality of the read data. More specifically, the ECC functions in a traditional capacity of confirming the integrity of the data and providing correction of single bit errors.

Figure 7:
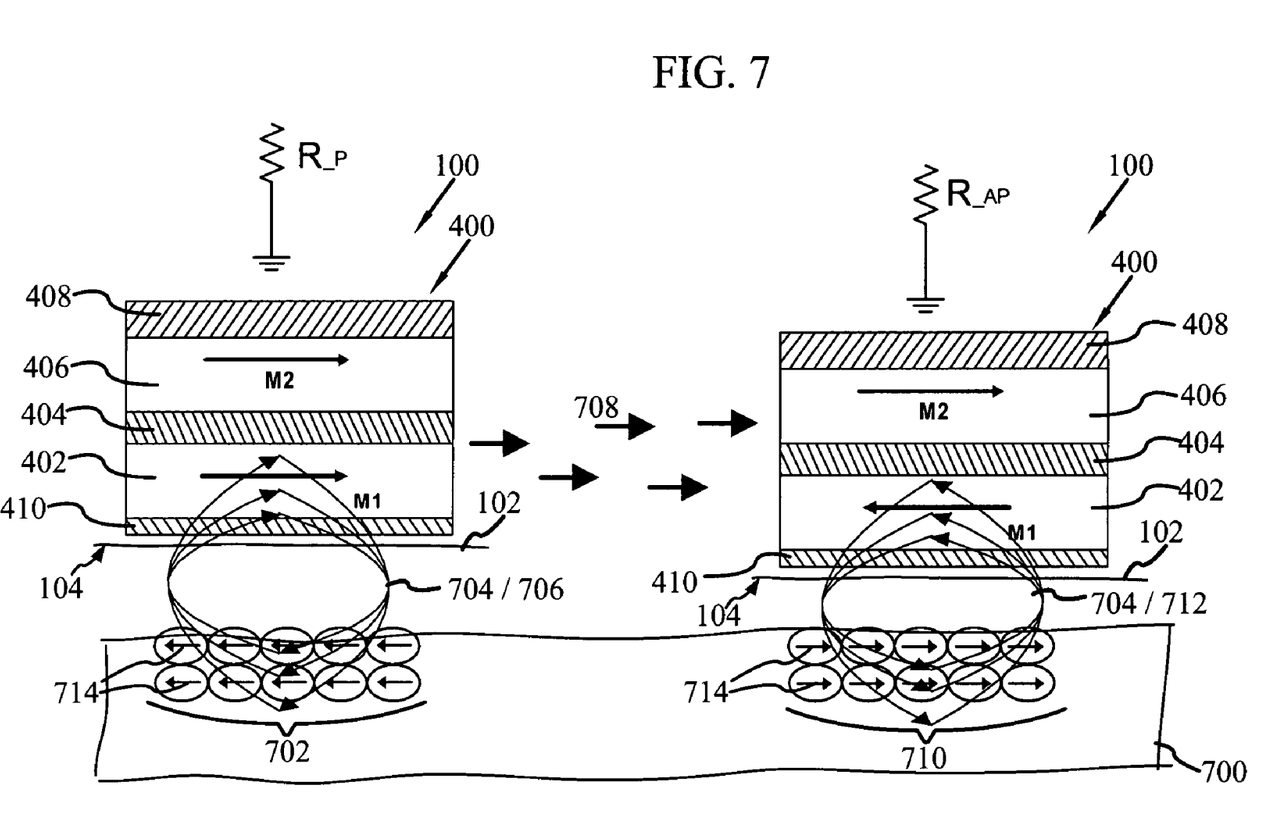
FIG. 7 is a conceptual illustration of a portion of an embodiment of the magnetic stripline scanner in operation.

The operation of the magnetic stripline scanner 100 may be more fully appreciated with respect to FIG. 7. Illustrated is a cross section portion of magnetic stripline scanner 100, showing an SVM cell 400 proximate to the scanning side 104 of a portion of housing 102. The illustrated portion of magnetic stripline scanner 100 is proximate to a media 700 encoded with magnetic data.

Each data patch such as data patch 652, shown in FIG. 6 is represented in FIG. 7 as groups of circles with aligned magnetic particles. Each circle is intended to represent a magnetic particle, the group of particles yielding the effective magnetic data bit 702, 710. More specifically, each magnetic data bit 702, 710 may represent appropriate magnetic media for the storage of a single bit, and not necessarily a cluster of bits.

The arrows 714 in magnetic data bits 702, 710 indicate the encoded magnetic field. As magnetic data bit 702 is aligned to point to the left, the emanating magnetic field 706 is shown as clockwise in nature. As magnetic data bit 710 is aligned to point to the right, the emanating magnetic field 712 is counter-clockwise in nature.

When magnetic stripline scanner 100 is positioned over magnetic data bit 702, the emanating magnetic field 704, specifically clockwise magnetic field 706, is of a sufficient threshold intensity to align the orientation M1 of the sense layer 402. In response to this alignment, the resistance state of SVM cell 400 becomes R_p (resistance parallel).

Movement of the magnetic stripline scanner is illustrated by arrows 708. As the magnetic stripline scanner 100 is moved to magnetic data bit 710, the sense layer 402 is influenced again by an emanating magnetic field 704, specifically in this case, counter-clockwise magnetic field 712. In this case, the magnetic field 712 orients M1 to align to the left. In response to this alignment, the resistance state of SVM cell 400 becomes R_ap (resistance anti-parallel).

Figure 8:
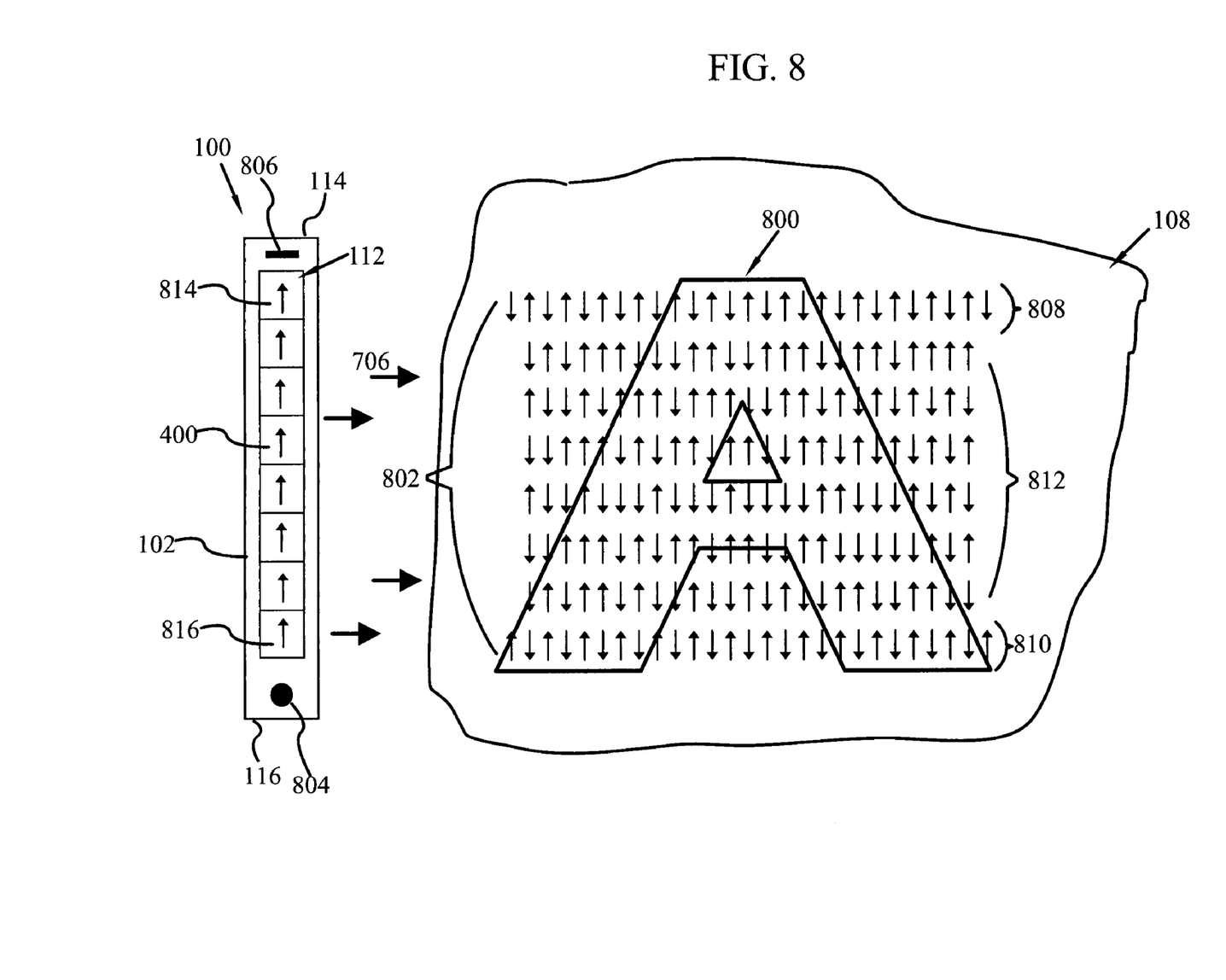
FIG. 8 is a partial illustration of an embodiment of the magnetic stripline scanner reading magnetic data encoded upon media providing visual data.

FIG. 8 conceptually illustrates a portion of media 108, such as paper, containing visual information 800 and encoded with magnetic material 802, such as magnetic ink. The magnetic material 802 includes particles capable of supporting high density data. The magnetic material 802 presented upon the media 108 may be combined with one or more of character text, charts, icons, symbols, images or other visual information as a user may desire.

Each data patch of magnetic material 802, such as magnetic ink or toner, is represented as aligned arrows in separate, substantially parallel rows. In at least one example, the magnetic material 802 is substantially invisible or beneath the ink comprising visual information 800. The magnetic material 802 may even be limited to correspond substantially with the placement of ink comprising visual information 800.

To detect different data patches, in at lest one embodiment, the magnetic stripline scanner 100 includes a means for detecting motion. More specifically, the magnetic stripline scanner 100 includes a movement sensor capable of detecting motion of the magnetic stripline scanner 100 across the media 108.

Several well known and readily available movement sensing devices may be adapted for use in connection with the magnetic stripline scanner 100. More specifically, to account for motion along the X-axis and Y-axis, a ball sensor 804, such as are commonly used computer mice, may be employed. Typically, the ball sensor 804 involves the use of two transverse rotation sensors in contact with the ball, one rotation sensor parallel to the X-axis and the second parallel to the Y-axis. Coupled to the controller, rotation of either or both rotation sensors permits the controller to determine the relative motion of the magnetic stripline scanner 100. Motion simply along the X-axis may be obtained with at least one wheel sensor 806.

Movement sensors involving physically moving parts may at times incur debris or other foreign matter that frustrates the detection of motion. Use of the magnetic encoded data advantageously provides the magnetic stripline scanner 100 with the ability to detect motion without reliance upon a wheel sensor 806 or ball sensor 804. More specifically, in at least one embodiment, magnetic data in data lines 812, set down in the magnetic material 802, is established upon the media 108 with at least a first and a second parallel reference line 808, 810, respectively. The user information is then located in lines of data 812 disposed between the first and second reference lines 808 and 810.

As the size of each data patch is known to the magnetic stripline scanner 100, each reference line 808, 810 comprises a known pattern, such as for example, the alternating orientations as shown in FIG. 8. The magnetic stripline scanner 100 is presented to the media 108 such that the stripline field sensor 112 (consisting of a plurality of SVM cells 400) is substantially transverse to the magnetic data in data lines 812, and parallel reference lines 808, 810. In such an orientation, SVM cell 814 will align to the first reference line 808, and SVM cell 816 will align to the second reference line 810.

As the controller is aware of the orientation sensed by each SVM cell 400, in at least one embodiment the controller may isolate the senses from SVM cells 814 and 816. By comparing the alternating sensed patterns from SVM cells 814 and 816 the alignment of the magnetic stripline scanner 100 to the media may be inferred, and the magnetic data as read from the data lines 812 buffered to insure proper processing.

As shown in FIG. 8, the magnetic stripline scanner 100 is capable of reading multiple lines of magnetic data in parallel. The extent to which the magnetic data lines 812 are read in parallel is of course adjustable—depending on the relative density of the magnetic data lines 812, the number of magnetic field sensors (such as SVM cells 400) provided, the length of the stripline field sensor 112, and the capacity of the data buffer, with or without ECC.

In addition, with respect to FIG. 8, it is further appreciated that the magnetic stripline scanner 100 is not intended to read traditional human user data as is performed by a traditional optical scanner. More specifically, the magnetic data read by the scanner may be obscured by traditional visual medial, or printed in invisible ink or toner. The magnetic data read by the magnetic stripline scanner 100 may also be provided at a resolution beyond the capability of a conventional optical scanner. Moreover, the magnetic stripline scanner 100 is advantageously reading the magnetic data in the native form of binary ones and zeros, which do not require processing for conversion from traditional human user visual communication The one-to-one relationship between magnetic field sensors 120 (such as the SVM cells 400) and the magnetic data patches is not intended to suggest an ever present one-to-one relationship. Rather, this has been for illustrative purposes. Given the precision of photolithography techniques, multiple SVM cells 400 may be provided in a stripline field sensor 112 such that multiple SVM cells 400 are influenced by the emanating magnetic field from a given data patch at any given time.

The use of multiple SVM cells 400 for each data patch may be preferred in certain applications as an additional method of confirming the encoded data. Further, in at least one embodiment, the controller 122 automatically corrects for skew and alignment errors occurring between the magnetic stripline scanner 100 and the media 108 providing the magnetic data 110 by over sampling.

In addition, although the above description has been provided with respect to the magnetic stripline scanner 100 being used for scanning purposes, it will be appreciated that each SVM cell 400 within the stripline field sensor 112 may generate a magnetic field of its own should a sufficient power current be provided along the corresponding first and second power conductors 408, 410. If the generated field is above the threshold coercivity of the encoded data patch, the field emanating from the SVM cell 400 may write a new orientation to a data patch located proximate to the SVM cell 400. As such, in at least one embodiment, the magnetic stripline scanner 100 is capable of writing to the lines of magnetic data as well as reading from them.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

We claim:

1. A magnetic stripline scanner for reading lines of magnetic data on a media comprising:
 a portable housing having a scanning side;
 a magnetic field sensing means disposed within the housing proximate to the scanning side for sensing data encoded as magnetic fields upon the media when the housing is oriented with respect to the media such that the scanning side is adjacent the media and magnetic data lines, the magnetic field sensing means including:
  at least one ferromagnetic sense layer providing an orientation of magnetization alterable in the presence of an external magnetic field of a threshold intensity;
  an intermediate layer in contact with the sense layer; and
  at least one reference layer in contact with the intermediate layer, opposite from the sense layer; and
 a magnetic field orientation detector means, disposed within the housing and coupled to the magnetic field sensing means, for detecting the relative orientation of a magnetic field sensed from each of a plurality of magnetic data sectors upon the media in the magnetic data lines.

2. The magnetic scanner of claim 1, wherein the magnetic field sensing means comprises a plurality of magnetic field sensors.

3. The magnetic scanner of claim 1, further comprising a buffer means for buffering sensed data.

4. The magnetic scanner of claim 1, further comprising a controller means for controlling the orientation detector means and interpreting the determined magnetic orientation as a "0" or "1".

5. The magnetic scanner of claim 1, further comprising a motion detection means for detecting movement of the scanner across the media when the scanning side of the housing is moved along a line of magnetic data to sense the orientation of the magnetic fields emanating from the magnetic data.

6. A magnetic stripline scanner for reading lines of magnetic data on a media comprising:
 a portable housing having a scanning side;
 a linear array of magnetic field sensors at least partially disposed within the housing and proximate to the scanning side, the magnetic field sensors capable of detecting external magnetic fields of a threshold intensity, each magnetic field sensor being a spin valve magnetic memory (SVM) cell including:
  at least one ferromagnetic sense layer providing an orientation of magnetization alterable in the presence of an external magnetic field of a threshold intensity;
  an intermediate layer in contact with the sense layer;
  at least one reference layer in contact with the intermediate layer, opposite from the sense layer; and
 a controller mounted in the housing and coupled to the linear array of magnetic field sensors, the controller capable of determining the orientation of a sensed external magnetic field.

7. The magnetic scanner of claim 6, wherein the controller further distinguishes between a first orientation and a second orientation for a sensed external magnetic field.

8. The magnetic scanner of claim 6, further comprising a self reference sense amplifier coupled to the linear array of magnetic field sensors.

9. The magnetic scanner of claim 8, further comprising a data buffer coupled between the self reference sense amplifier and the controller.

10. The magnetic scanner of claim 6, wherein the scanner is configured to read digital magnetic data.

11. The magnetic scanner of claim 6, wherein the magnetic data is not visually apparent to a user.

12. The magnetic scanner of claim 6, wherein each SVM cell is further configured to provide a write magnetic field sufficient to re-orient the magnetic field of the magnetic data.

13. The magnetic scanner of claim 6, further comprising at least one movement sensor responsive to relative movement between the linear array of magnetic field sensors and the magnetic data on the media.

14. The magnetic scanner of claim 6, wherein the controller is further coupled to the movement sensor, the controller operable to reset the magnetic field sensors in response to a movement signal from the movement sensor.

15. The magnetic scanner of claim 6, further comprising a battery power supply.

16. The magnetic scanner of claim 6, further comprising at least one output device coupled to the controller to provide information read from the magnetic data on the media.

17. The magnetic scanner of claim 16, wherein the output device is a communications port disposed within the housing.

18. The magnetic scanner of claim 16, wherein the output device is a visual display.

19. A magnetic stripline scanner system for reading lines of magnetic data encoded in magnetic material on a media comprising:
a media
at least two parallel reference lines on the media;
at least one line of magnetic material including magnetic particles capable of supporting high density data, the at least one line disposed between two reference lines;
a magnetic scanner including:
a portable housing having a first end, a second end and a scanning side therebetween;
a linear array of magnetic field sensors at least partially disposed within the housing and proximate to the scanning side, the magnetic field sensors capable of detecting external magnetic fields of a threshold intensity, each magnetic field sensor being a spin valve magnetic memory (SVM) cell including:
at least one ferromagnetic sense layer providing an orientation of magnetization alterable in the presence of an external magnetic field of a threshold intensity;
an intermediate layer in contact with the sense layer; and
at least one reference layer in contact with the intermediate layer, opposite from the sense layer; and
a controller mounted in the housing and coupled to the linear array of magnetic field sensors, the controller capable of determining the orientation of a sensed external magnetic field;

wherein the magnetic scanner is presented to the media transverse to the reference lines, the first end proximate to the first reference line, the second end proximate to the second reference line, the scanning side presented to the magnetic data, the magnetic scanner operable to detect and determine the magnetic field orientation of magnetic data as the magnetic scanner is moved across the line of magnetic material.

20. The magnetic scanner system of claim 19, wherein the reference lines provide magnetically encoded alignment information.

21. The magnetic scanner system of claim 19, wherein the magnetic material presented on the media is combined with one or more character text, charts, icons, symbols or images.

22. The magnetic scanner system of claim 19, wherein the media is paper.

23. The magnetic scanner system of claim 19, wherein the magnetic data read by the scanner is configured with visual data observed by a user.

24. The magnetic scanner system of claim 19, wherein each SVM cell is further configured to provide a write magnetic field sufficient to re-orient the magnetic field of the magnetic data.

25. A method of scanning lines of magnetic data on a media with a portable magnetic stripline scanner consisting of portable housing having a scanning side and a plurality of magnetic field sensors disposed within the housing proximate to the scanning side, the method comprising:
placing the scanning side of the scanner adjacent to the media and lines of magnetic data such that at least a subset of the magnetic field sensors are proximate to the magnetic data, each magnetic field sensor being a spin valve magnetic memory (SVM) cell including:
at least one ferromagnetic sense layer providing an orientation of magnetization alterable in the presence of an external magnetic field of a threshold intensity:
an intermediate layer in contact with the sense layer; and
at least one reference layer in contact with the intermediate layer, opposite from the sense layer;
moving the scanner along the lines of magnetic data;
sensing data encoded as magnetic fields emanating from the lines of magnetic data by disposing at least one ferromagnetic sense layer of at least one SVM cell into an emanating magnetic field;
detecting the orientation of the emanating magnetic fields by evaluating the resistance between the sense layer and the reference layer of at least one SVM cell affected by the magnetic fields; and
determining the stored data value based upon the detected orientation.

26. The method of claim 25, wherein the movement of the scanner is parallel to the lines of magnetic data.

27. The method of claim 25, further including over sampling each sensed magnetic field.

28. The method of claim 25, wherein the determined stored value corresponds to a "0" or "1".

29. The method of claim 25, wherein multiple lines of magnetic data are scanned simultaneously.

* * * * *

UNITED STATES PATENT AND TRADEMARK OFFICE
CERTIFICATE OF CORRECTION

PATENT NO.         : 7,327,868 B2  
APPLICATION NO. : 10/861008  
DATED                 : February 5, 2008  
INVENTOR(S)       : Fredrick A. Perner et al.

Page 1 of 1

It is certified that error appears in the above-identified patent and that said Letters Patent is hereby corrected as shown below:

In column 11, line 39, in Claim 19, after "media" insert -- ; --.

In column 12, line 38, in Claim 25, after "intensity" delete ":" and insert -- ; --, therefor.

In column 12, line 61, in Claim 28, delete "toa""0"or"1"" and insert -- to a "0" or "1" --, therefor.

Signed and Sealed this

Twelfth Day of August, 2008

JON W. DUDAS  
*Director of the United States Patent and Trademark Office*